United States Patent
Tan et al.

(10) Patent No.: US 12,489,705 B2
(45) Date of Patent: Dec. 2, 2025

(54) NETWORK DATA PACKET FILTERING METHOD AND TRANSMISSION METHOD, AND TERMINAL DEVICE

(71) Applicant: Huawei Technologies Co., Ltd., Shenzhen (CN)

(72) Inventors: Zhengbin Tan, Xi'an (CN); Kunpeng Zhang, Xi'an (CN); Xiaoyu Fan, Xi'an (CN); Yanzhao He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 392 days.

(21) Appl. No.: 18/006,329

(22) PCT Filed: Jul. 19, 2021

(86) PCT No.: PCT/CN2021/107145
§ 371 (c)(1),
(2) Date: Jan. 20, 2023

(87) PCT Pub. No.: WO2022/017327
PCT Pub. Date: Jan. 27, 2022

(65) Prior Publication Data
US 2024/0039843 A1 Feb. 1, 2024

(30) Foreign Application Priority Data
Jul. 23, 2020 (CN) .......................... 202010716584.8

(51) Int. Cl.
H04L 45/74 (2022.01)

(52) U.S. Cl.
CPC .................................. *H04L 45/74* (2013.01)

(58) Field of Classification Search
CPC ... H04L 41/0604; H04L 41/069; H04L 45/74; H04L 63/00
See application file for complete search history.

(56) References Cited

U.S. PATENT DOCUMENTS

| | | | |
|---|---|---|---|
| 2018/0199215 A1* | 7/2018 | Patil | H04W 52/0225 |
| 2019/0149516 A1* | 5/2019 | Rajahalme | H04L 45/74 370/392 |

FOREIGN PATENT DOCUMENTS

| | | |
|---|---|---|
| CN | 103167451 A | 6/2013 |
| CN | 103560973 A | 2/2014 |
| CN | 106804045 A | 6/2017 |
| CN | 106815085 A | 6/2017 |
| CN | 110337137 A | 10/2019 |
| CN | 111092785 A | 5/2020 |

\* cited by examiner

*Primary Examiner* — Mansour Oveissi
(74) *Attorney, Agent, or Firm* — Conley Rose, P.C.

(57) ABSTRACT

A network data packet filtering method includes receiving a network data packet, obtaining a communication 5-tuple in the network data packet through parsing, determining, by determining that the communication 5-tuple in the network data packet matches at least one of one or more communication 5-tuple entries, that the network data packet is a broadcast data packet to be discarded, and discarding the broadcast data packet.

20 Claims, 10 Drawing Sheets

| | Source IP | Source port | Destination IP | Destination port | Communication protocol |
|---|---|---|---|---|---|
| Entry 1: < | 0, | 0, | 198.220.220.255, | 0, | 0 > |
| Entry 2: < | 0, | 0, | 0, | 137, | 0 > |
| Entry 3: < | 0, | 0, | 0, | 445, | UDP > |
| Entry 4: < | 0, | 0, | 255.255.255.255, | 0, | 0 > |
| Entry 5: < | 198.220.220.10, | 0, | 0, | 0, | 0 > |

| | Source IP | Source port | Destination IP | Destination port | Communication protocol |
|---|---|---|---|---|---|
| Entry 1: < | 0, | 0, | 198.220.220.255, | 0, | 0 > |
| Entry 2: < | 0, | 0, | 0, | 137, | 0 > |
| Entry 3: < | 0, | 0, | 0, | 445, | UDP > |
| Entry 4: < | 0, | 0, | 255.255.255.255, | 0, | 0 > |
| Entry 5: < | 198.220.220.10, | 0, | 0, | 0, | 0 > |

| | | | | |
|---|---|---|---|---|
| NBNS | 94 | Name | query | NBSTAT |
| ICMP | 122 | Destination unreachable | | |
| NBNS | 94 | Name | query | NBSTAT |
| ICMP | 122 | Destination unreachable | | |
| NBNS | 94 | Name | query | NBSTAT |
| ICMP | 122 | Destination unreachable | | |

NETWORK DATA PACKET FILTERING METHOD AND TRANSMISSION METHOD, AND TERMINAL DEVICE

CROSS-REFERENCE TO RELATED APPLICATIONS

This is a U.S. National Stage of International Patent Application No. PCT/CN2021/107145 filed on Jul. 19, 2021, which claims priority to Chinese Patent Application No. 202010716584.8 filed on Jul. 23, 2020. Both of the aforementioned applications are hereby incorporated by reference in their entireties.

TECHNICAL FIELD

This application relates to the field of network communication technologies, and in particular, to a network data packet filtering method and transmission method, a terminal device, and a computer-readable storage medium.

BACKGROUND

When a terminal device receives a data packet from a network, a modem (Modem) converts the data packet into a signal that can be recognized and read by an application processor (Application Processor, AP), and then the application processor parses the data packet, to obtain destination address information (for example, a destination port number) of the data packet. Then the application processor delivers message information carried in the data packet to a corresponding application based on the destination address information.

IPv4 address space has a limited quantity of IP addresses. Currently, when deploying a network, an operator uses a hierarchical routing architecture in which terminal devices served by each router share a network segment. In this way, terminal devices served by the same router face problems such as TCP and UDP data packet broadcast. After receiving a broadcast data packet, a terminal device parses the data packet by using an application processor. When discovering that there is no application program for receiving the data packet, the application processor discards the data packet.

To process a broadcast data packet from a network, an application processor needs to be frequently woken up, causing some unnecessary power consumption.

SUMMARY

Some implementations of this application provide a network data packet filtering method, a network data packet transmission method, a terminal device, and a computer-readable storage medium. The following describes this application from a plurality of aspects. Implementations and beneficial effects of the following plurality of aspects can be cross-referenced.

According to a first aspect, an implementation of this application provides a network data packet filtering method, which is applied to a terminal device. The terminal device stores one or more communication 5-tuple entries, and each communication 5-tuple entry is used to determine a broadcast data packet based on a preset rule. The method includes: receiving a network data packet; obtaining a communication 5-tuple in the network data packet through parsing, determining, by determining that the communication 5-tuple in the network data packet matches at least one of the one or more communication 5-tuple entries, that the network data packet is a broadcast data packet to be discarded; and discarding the broadcast data packet.

According to this implementation of this application, whether the received network data packet is a broadcast data packet is determined based on the communication 5-tuple entry stored in the terminal device, and filtering is performed on the data packet, to reduce power consumption of the terminal device. When a large quantity of broadcast data packets exist in a network environment, this implementation of this application can significantly reduce power consumption of the terminal device.

In some implementations, the determining, by determining that the communication 5-tuple in the network data packet matches at least one of the one or more communication 5-tuple entries, that the network data packet is a broadcast data packet to be discarded further includes: determining, by determining that the communication 5-tuple in the network data packet matches at least one of the one or more preset communication 5-tuple entries, that the network data packet is a broadcast data packet, and discarding the broadcast data packet when determining that an application program corresponding to the network data packet is not running on the terminal device.

According to this implementation of this application, when it is determined that the network data packet received by the terminal device is a broadcast data packet, whether the network data packet is a data packet not required by the terminal device is further determined. When the network data packet is a data packet not required by the terminal device, the data packet is discarded, thereby reducing power consumption of the terminal device.

In some implementations, the method is performed by a modem of the terminal device.

According to this implementation of this application, the modem of the terminal device performs filtering on the network data packet, to avoid frequently waking up an application processor of the terminal device, thereby further reducing power consumption of the terminal device.

In some implementations, the one or more communication 5-tuple entries are stored in the modem.

In some implementations, the preset rule is set by defining a value of a field included in the communication 5-tuple entry.

In some implementations, a value of a destination port field of at least one communication 5-tuple entry is defined as 123, 137, 138, 139, 445, or 593.

In some implementations, a value of a destination IP address field of at least one communication 5-tuple entry is defined as a broadcast IP address.

In some implementations, one or more fields in the communication 5-tuple entry are wildcard fields.

In some implementations, the determining that an application program corresponding to the network data packet is not running on the terminal device includes: obtaining port information currently listened to by the application processor of the terminal device; and determining, based on the port information, that the application program corresponding to the network data packet is not running on the terminal device.

In some implementations, the method further includes: obtaining a current working mode of the terminal device, where a working mode of the terminal device includes a network data packet receiving restriction mode and another mode other than the network data packet receiving restriction mode; and discarding the received broadcast data packet when determining that the current working mode of the terminal device is the network data packet receiving restriction mode, determining that the network data packet is a broadcast data packet, and determining that the application program corresponding to the network data packet is not running on the terminal device.

According to this implementation of this application, when the current working mode of the terminal device is the network data packet receiving restriction mode, filtering is performed on the received network data packet, to discard a broadcast data packet not required by the user device. In this implementation of this application, missing of an IMS call can be avoided while power consumption of the terminal device is reduced.

In some implementations, the obtaining a current working mode of the terminal device includes: the modem of the terminal device obtains the current working mode of the terminal device from the application processor of the terminal device.

In some implementations, when one or more of the following conditions are met, the application processor determines that the current working mode of the terminal device is the network data packet receiving restriction mode; system time of the terminal device falls within a specified time segment; a display of the terminal device is off; an IP multimedia system of the terminal device is not registered or a voice over LTE function of the terminal device is disabled; an amount of invalid data packets received by the terminal device in a specified period of time exceeds a specified threshold, where an invalid data packet is a data packet whose destination port is not listened to by the application processor of the terminal device; or a do-not-disturb switch of the terminal device is turned on.

According to a second aspect, an implementation of this application provides a network data packet transmission method, which is performed by a modem of a terminal device. The method includes: receiving a paging message sent by a network-side device; obtaining a current working mode of the terminal device, where a working mode of the terminal device includes a network data packet receiving restriction mode and another mode other than the network data packet receiving restriction mode; and ignoring the received paging message when determining that the current working mode of the terminal device is the network data packet receiving restriction mode.

According to this implementation of this application, when the current working mode of the terminal device is the network data packet receiving restriction mode, the received paging message is ignored (for example, an RRC connection is not established or a data packet from a network is not received), thereby reducing power consumption of the user device.

In some implementations, the obtaining a current working mode of the terminal device includes: the modem obtains the current working mode of the terminal device from an application processor of the terminal device.

In some implementations, when one or more of the following conditions are met, the application processor determines that the current working mode of the terminal device is the network data packet receiving restriction mode; system time of the terminal device falls within a specified time segment; a display of the terminal device is off; an IP multimedia system of the terminal device is not registered or a voice over LTE function of the terminal device is disabled; an amount of invalid data packets received by the terminal device in a specified period of time exceeds a specified threshold, where an invalid data packet is a data packet whose destination port is not listened to by the application processor of the terminal device; or a do-not-disturb switch of the terminal device is turned on.

According to a third aspect, an implementation of this application provides a terminal device, including: a memory, configured to store instructions executed by one or more processors of the terminal device; and the processor, where when the processor executes the instructions in the memory, the terminal device is enabled to perform the network data packet filtering method according to any implementation of the first aspect in this application, or perform the network data packet transmission method according to any implementation of the first aspect in this application. For beneficial effects that the third aspect can achieve, refer to the beneficial effects of the method according to any implementation of the first aspect or any implementation of the second aspect. Details are not described herein again.

According to a fourth aspect, an implementation of this application provides a computer-readable storage medium. The computer-readable storage medium stores instructions. When the instructions are executed on a computer, the computer is enabled to perform the network data packet filtering method according to any implementation of the first aspect in this application, or perform the network data packet transmission method according to any implementation of the first aspect in this application. For beneficial effects that the fourth aspect can achieve, refer to the beneficial effects of the method according to any implementation of the first aspect or any implementation of the second aspect. Details are not described herein again.

DESCRIPTION OF EMBODIMENTS

The following describes in detail specific implementations of this application with reference to the accompanying drawings.

Figure 1:
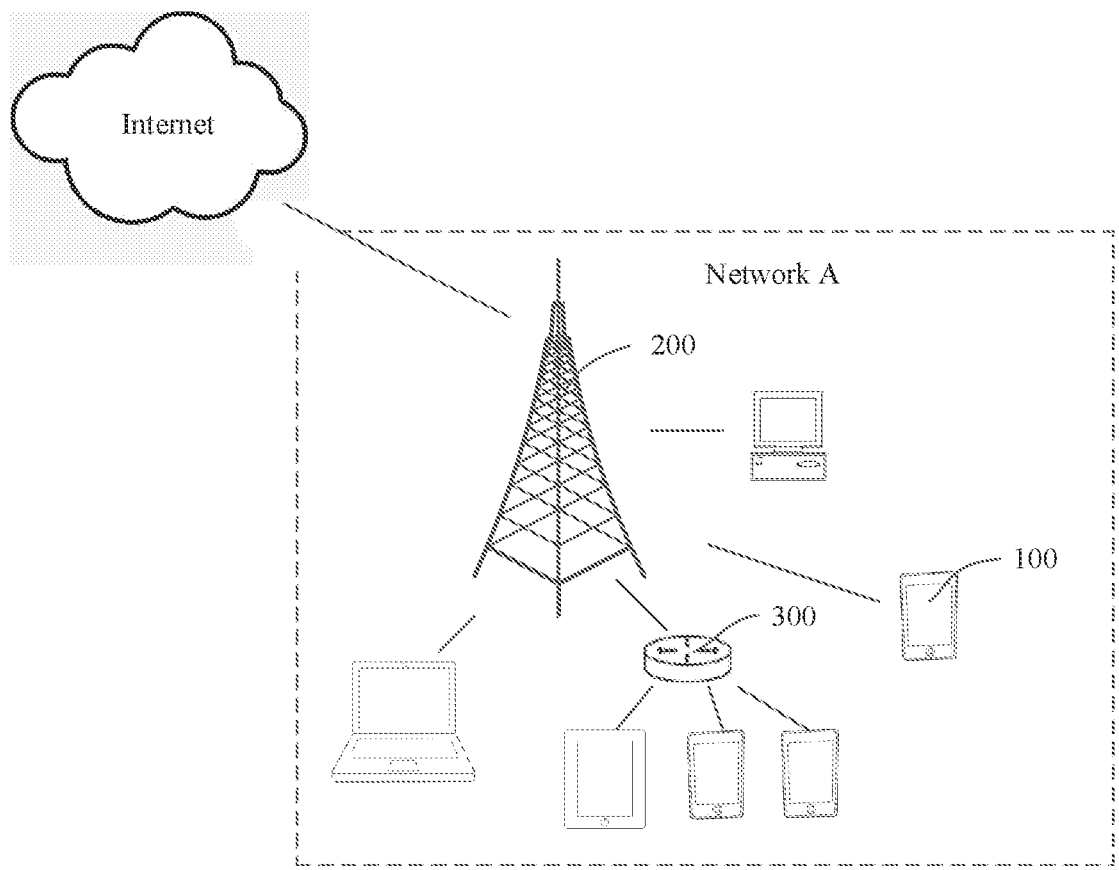
FIG. 1 is a schematic diagram of a structure of a mobile communication network according to an embodiment of this application.

FIG. 1 is a schematic diagram of a structure of a mobile communication network A (for example, an LTE network or a 5G network) according to an implementation of this application. The network A is connected to the Internet, so that a device (for example, a terminal device 100 and a terminal device that is connected to a routing device 300) connected to the network A can communicate with another host on the Internet.

The mobile communication network A includes a plurality of terminal devices and a network-side device 200. The network-side device 200 provides an interface for the terminal device to connect to the Internet, for example, providing functions such as radio coverage, packet data transfer, and IP address allocation for the terminal device. The terminal device can communicate with another host on the Internet by using the functions provided by the network-side device 200. It can be understood that the terminal devices on the network A share the same network segment (in other words, the terminal devices on the network A have the same network ID). Therefore, when a device on the Internet sends a broadcast message to the network A, all the terminal devices on the network A can receive the broadcast message.

Figure 2:
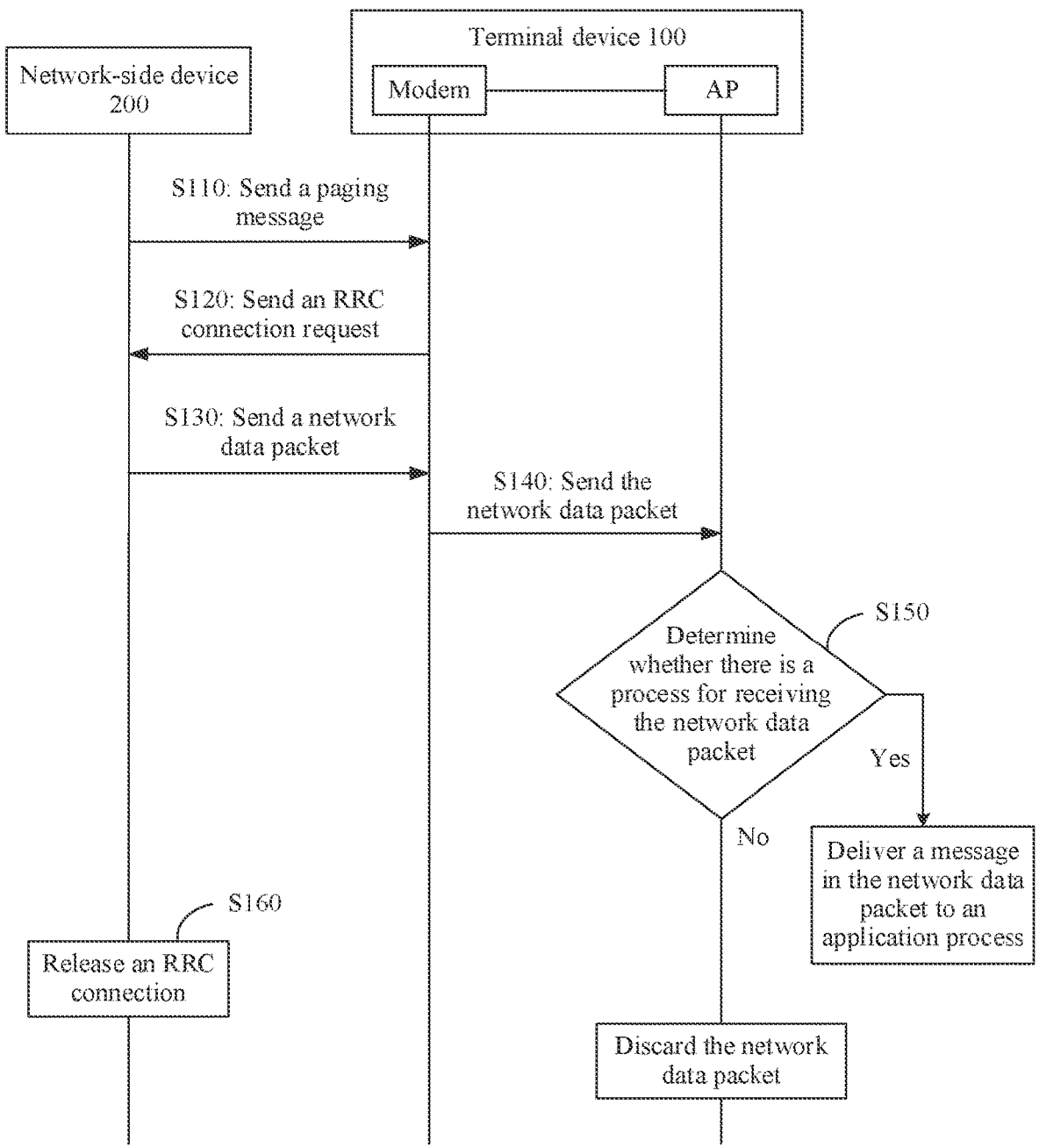
FIG. 2 shows a workflow in which a terminal device receives a network data packet in a conventional technology.

A workflow in which the terminal device 100 receives a network data packet in a conventional technology is described with reference to a scenario shown in FIG. 1. Referring to FIG. 2, the workflow includes the following steps.

S110: The network-side device 200 sends a paging message (PS paging) to the terminal device 100.

A purpose of sending the paging message to the terminal device 100 by the network-side device 200 is to establish a signaling connection between the network-side device 200 and the terminal device 100. After the terminal device 100 receives the paging message, the terminal device 100 is triggered to initiate a signaling connection (for example, radio resource control (Radio Resource Control, RRC) connection in step S120) request to the network-side device.

S120: In response to the received paging message, the terminal device 100 sends an RRC connection request to the network-side device 200; and after receiving the RRC connection request sent by the terminal device 100, the network-side device 200 establishes an RRC connection to the terminal device 100.

The RRC connection is a channel through which the network-side device 200 sends control signaling to the terminal device 100. Through the RRC connection, the network-side device 200 allocates a radio resource (for example, a frequency, a timeslot, and power) to the terminal device 100, and provides signaling control for a data transmission workflow (for example, a network data packet transmission workflow in step S130) between the network-side device 200 and the terminal device 100.

S130: After establishing the RRC connection, the network-side device 200 sends a network data packet to the terminal device 100, and a modem (Modem) of the terminal device 100 receives the network data packet delivered by the network-side device 200.

The modem is a baseband subsystem of the terminal device 100, and is configured to demodulate a modulated signal from a network, to convert the signal from the network into a signal that can be recognized and read by an application processor AP of the terminal device 100. In a terminal device 100 that supports cellular communication, a modem may further be configured to implement a cellular communication protocol stack.

S140: The modem of the terminal device 100 sends the received network data packet to the application processor AP.

After processing (for example, demodulating) the received network data packet, the modem sends the network data packet to the application processor AP. When the modem sends the network data packet to the application processor AP, an interrupt signal is generated in the application processor AP, so that the application processor AP performs processing corresponding to the interrupt signal. In this specification, this workflow is referred to as "waking up the application processor AP".

S150: The application processor AP parses the network data packet (for example, parses the network data packet to obtain a destination port number), and determines whether there is a destination application process for receiving the network data packet; and if yes, delivers a message in the network data packet to the destination application process; otherwise, discards the network data packet. In this specification, a data packet with no receiving application process available is called a "data packet not required by the terminal device 100" or an "invalid data packet".

S160: After an inactivity timer of the RRC connection times out, the network-side device 200 releases the RRC connection.

In step S150, if determining that there is no application process for receiving the network data packet, the application processor AP discards the network data packet. In other words, the application processor AP does not respond to the data packet (for example, sending a confirmation of receipt or an acknowledgment message to a network). In this way, when the inactivity timer of the RRC connection times out, the network-side device 200 releases the RRC connection.

In a network environment, the terminal device 100 receives a large quantity of broadcast data packets, and many of the broadcast data packets are data packets not required by the terminal device 100. However, after the terminal device 100 receives the broadcast data packets, the application processor AP is frequently woken up. Therefore, excessive power consumption is resulted for the terminal device 100.

Therefore, an implementation of this application provides a network data packet filtering method, which is used to reduce power consumption of the terminal device 100. Specifically, when receiving a network data packet, the modem determines whether the received network data packet is a data packet not required by the terminal device 100. When the network data packet is a data packet not required by the terminal device 100, the modem does not wake up the application processor AP, but directly discards the data packet instead. This implementation of this application can avoid frequently waking up the application processor AP, thereby reducing power consumption of the terminal device 100.

The following describes specific embodiments of this application with reference to the scenario shown in FIG. 1. However, this application is not limited thereto. Technical solutions of this application may also be applied to other scenarios in addition to the scenario shown in FIG. 1, for example, a scenario in which the terminal device 100 is connected to the Internet by using a wired communication network.

Figure 3:
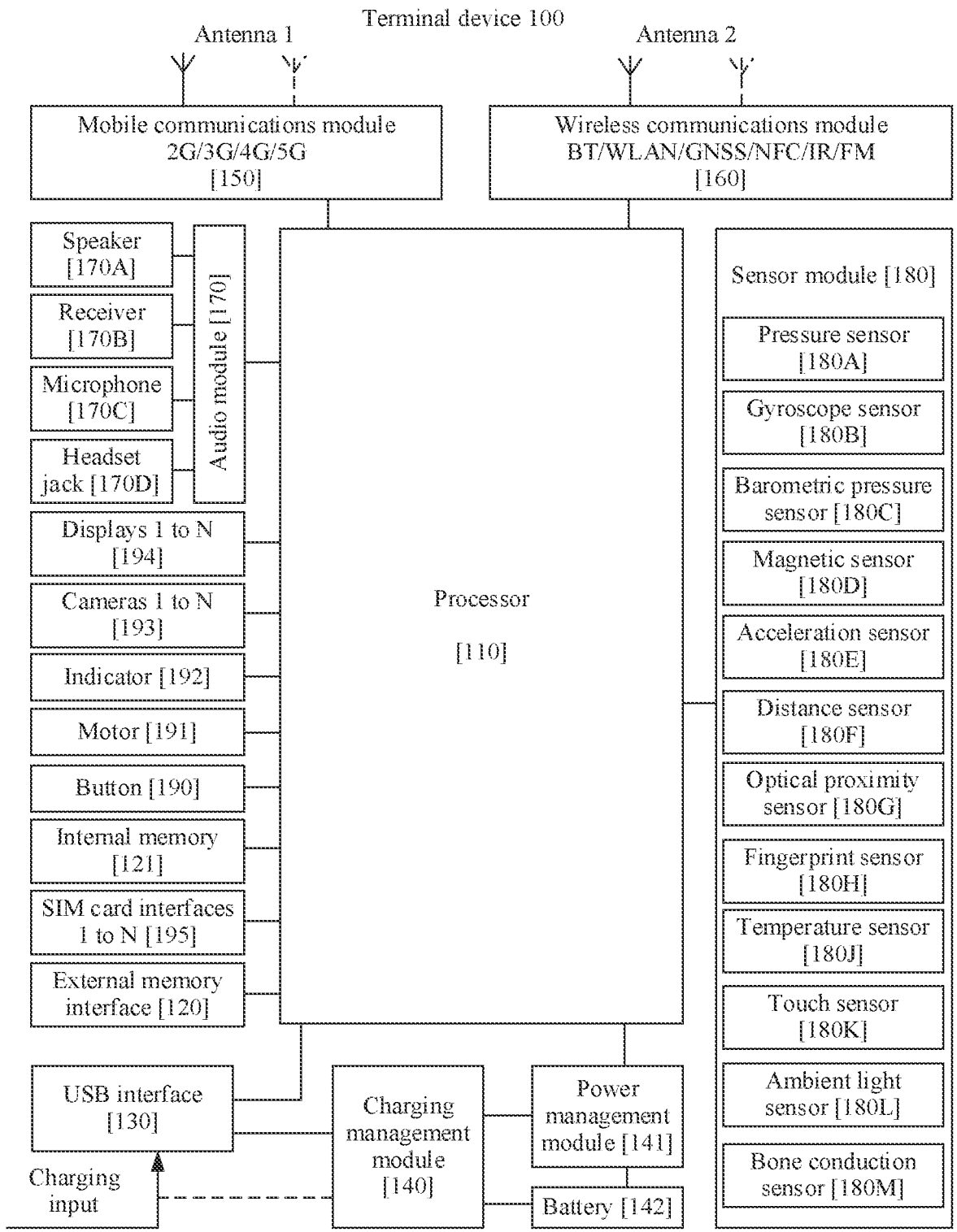
FIG. 3 is a schematic diagram of a structure of a terminal device according to an embodiment of this application.

FIG. 3 is a schematic diagram of a structure of a terminal device 100 according to an embodiment of this application.

The terminal device 100 may be implemented as a terminal device with a communication function, for example, a mobile phone, a desktop computer, a tablet computer, a wearable device, a laptop device, a multimedia device, a positioning device, or a game device, which is not limited in this application.

The terminal device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the terminal device 100. In some other embodiments of this application, the terminal device 100 may include more or fewer components than those shown in the figure, combine some components, split some components, or have different component arrangements. The components shown in the figure may be implemented by using hardware, software, or a combination of software and hardware.

The processor 110 may include one or more processing units. In this embodiment, the processor 110 includes an application processor (application processor. AP) and a modem (Modem). The processor 110 may further include a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

The processor may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, and a subscriber identification module (subscriber identification module, SIM) interface.

The I2C interface is a two-way synchronization serial bus, and includes one serial data line (serial data line, SDA) and one serial clock line (serial clock line, SCL). In some embodiments, the processor 110 may include a plurality of groups of I2C buses.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used for audio communication, and analog signal sampling, quantization, and coding. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually used to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The GPIO interface may be configured by using software. The GPIO interface may be configured as a control signal, or may be configured as a data signal. In some embodiments, the GPIO interface may be configured to connect the processor 110 to the camera 193, the display 194, the wireless communications module 160, the audio module 170, the sensor module 180, or the like. The GPIO interface may be further configured as the I2C interface, the I2S interface, the UART interface, the MIPI interface, or the like.

It may be understood that an interface connection relationship between the modules that is shown in this embodiment of the present invention is merely an example for description, and does not constitute a limitation on the structure of the terminal device 100. In some other embodiments of this application, the terminal device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the terminal device 100. The charging management module 140 may further supply power to the terminal device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. The power management module 141 may be configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may alternatively be disposed in the same component.

A wireless communication function of the terminal device 100 may be implemented by using an antenna 1, an antenna 2, the mobile communications module 150, the wireless communications module 160, the modem, the baseband processor, and the like.

The antenna 1 and the antenna 2 are configured to transmit and receive an electromagnetic wave signal. Each antenna in the terminal device 100 may be configured to cover one or more communication bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a wireless communication solution, including 2G/3G/4G/5G. or the like, that is applied to the terminal device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a voice signal by using an audio device, or displays an image or a video by using the display. In some embodiments, the modem processor may be an independent component. In some other embodiments, the modem processor may be independent of the processor 110, and is disposed in the same device as the mobile communications module 150 or another functional module.

The wireless communications module 160 may provide a wireless communication solution that is applied to the terminal device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the terminal device 100 are coupled, and the antenna 2 and the wireless communications module 160 in the terminal device 100 are coupled, so that the terminal device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system. BDS), a quasi-zenith satellite system (quasi-zenith satellite system, QZSS), and/or a satellite based augmentation system (satellite based augmentation system, SBAS).

The external memory interface 120 may be used to connect to an external storage card, for example, a micro SD card, to extend a storage capability of the terminal device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and an address book) and the like that are created during use of the terminal device 100. In addition, the internal memory 121 may include a high-speed random access memory, and may further include a nonvolatile memory, for example, at least one magnetic disk storage device, a flash memory device, or a universal flash storage (universal flash storage, UFS). The processor 110 runs instructions stored in the internal memory 121 and/or instructions stored in the memory disposed in the processor, to perform various function applications and data processing of the terminal device 100.

To facilitate understanding of the technical solutions of the embodiments, a workflow of sending a broadcast data packet is first described.

On the Internet, a location of each node device (for example, a terminal device or a router) on a network is identified by using an IP address. An IP address includes a network ID (net ID) field and a host ID (host ID) field. The network ID field is used to mark a network on which a host is located, and the host ID is used to mark the host. An IP address in which a host ID field is "all 1s" is a broadcast IP address. A network data packet whose destination IP address is the broadcast IP address is sent to all hosts on a destination network. It should be noted that "all 1s" is a binary expression of a value of the host ID field. When the host ID field is an 8-bit binary number (to be specific, when a binary expression of the host ID field is 11111111), a decimal expression corresponding to the host ID field is 255, and a hexadecimal expression corresponding to the host ID field is FF.

For example, an IP address of a terminal device 100 is 198.220.220.3. According to an IP protocol, a network ID of a network (namely, a network A) on which the terminal device 100 is located is 198.220.220, and a host ID of the terminal device 100 on the network is 3. If a destination IP address of a network data packet on the network is 198.220.220.255, the network data packet is sent to all hosts (including the terminal device 100) connected to the network A.

In addition, if a host sending a broadcast data packet and the terminal device 100 are located on the same network (in other words, both are located on the network A), the host may send the broadcast data packet to all the hosts on the network A by using an IP address 255.255.255.255 (where the IP address 255.255.255.255 is also referred to as a "limited broadcast address").

The following describes specific embodiments of this application.

Embodiment 1

Figure 4:
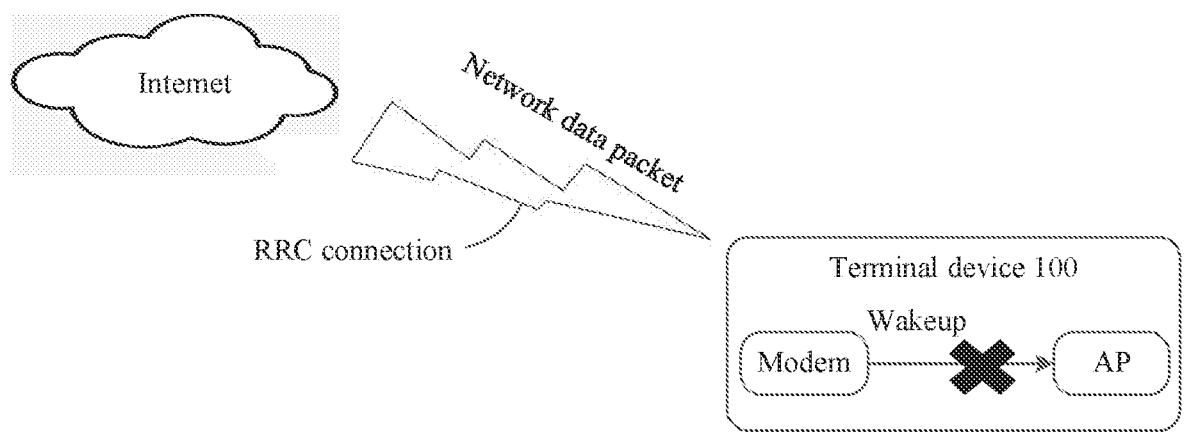
FIG. 4 is a schematic diagram of a principle of a network data packet filtering method according to an embodiment of this application.

Referring to FIG. 4, this embodiment provides a network data packet filtering method, to reduce power consumption of a terminal device 100. It is assumed that in a communication workflow in this embodiment, a host (where the host is a source host in this communication workflow) on a network sends a broadcast data packet to a network A. In this case, all terminal devices on the network A can receive the broadcast data packet (in other words, all the terminal devices on the network A are destination hosts in this communication workflow). The following uses the terminal device 100 as an example to describe the network data packet filtering method provided in this embodiment. However, it can be understood that the method provided in this embodiment is applicable to any other node device on the network A.

Specifically, the terminal device 100 includes a modem and an application processor AP. When receiving a network data packet, the modem determines whether the received network data packet is a data packet not required by the terminal device 100. When the network data packet is a data packet not required by the terminal device 100, the modem does not wake up the application processor AP, but directly discards the data packet instead. This embodiment can avoid frequently waking up the application processor AP, thereby reducing power consumption of the terminal device 100.

In addition, in this embodiment, a source host may be a mobile terminal or may be a fixed terminal, may be a device that accesses the Internet by using a mobile communication network or may be a device that accesses the Internet by using a wired network, and may be located on the same network (namely, the network A) as the terminal device 100 or may be located on a network different from a network on which the terminal device 100 is located.

Figure 5A:
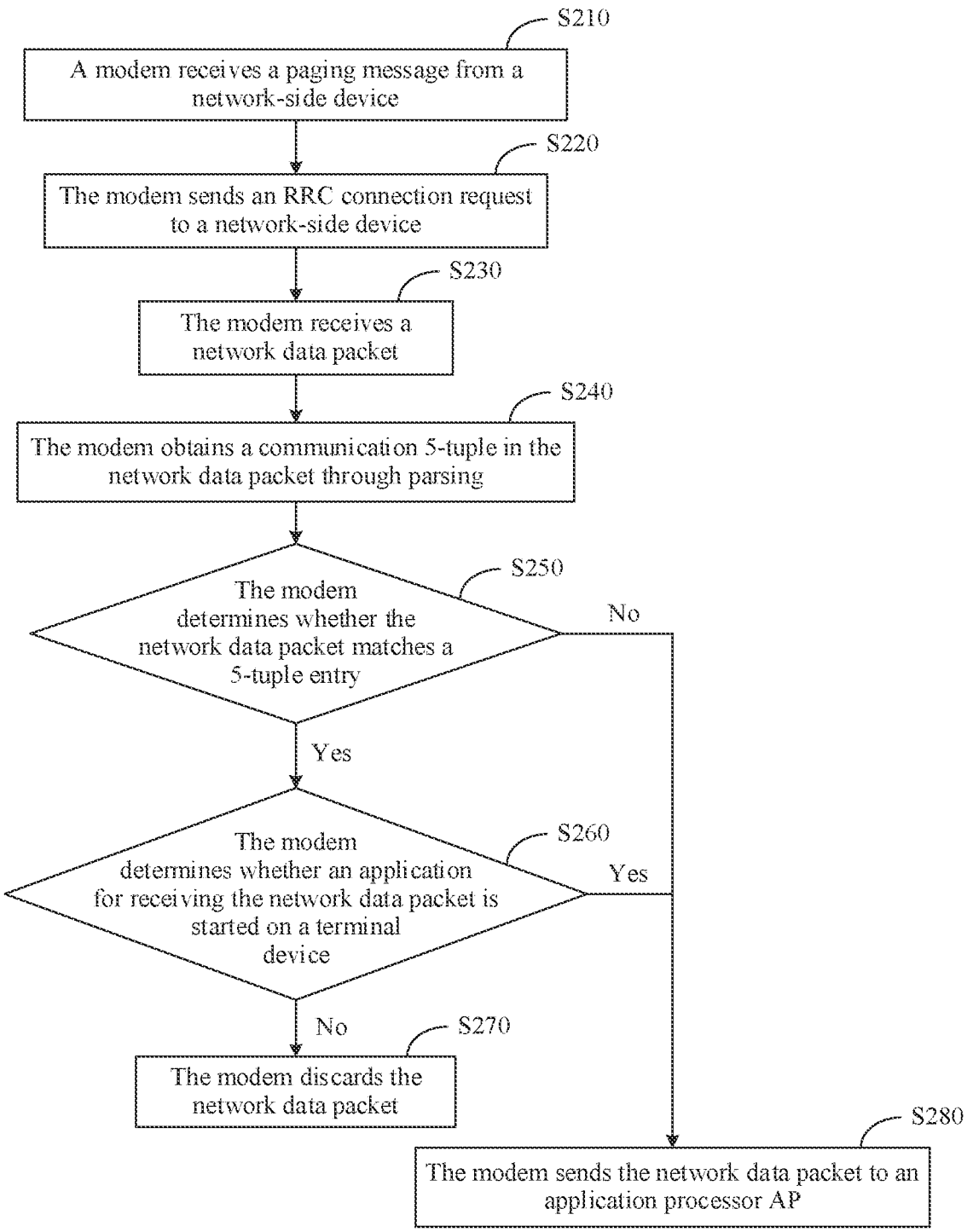
FIG. 5a is a first schematic flowchart of a network data packet filtering method according to an embodiment of this application.

Referring to FIG. 5a, the method in this embodiment includes the following steps.

S210: The modem receives a paging message from a network-side device 200.

S220: The modem sends an RRC connection request to the network-side device 200, to establish an RRC connection to the network-side device 200.

Step 210 and step 220 are used to establish a signaling connection between the terminal device 100 and a network side 200. For a specific workflow, refer to a workflow in a conventional technology (for example, steps S110 and S120 above). Details are not described herein again.

S230: The modem receives a network data packet.

Figure 5B:
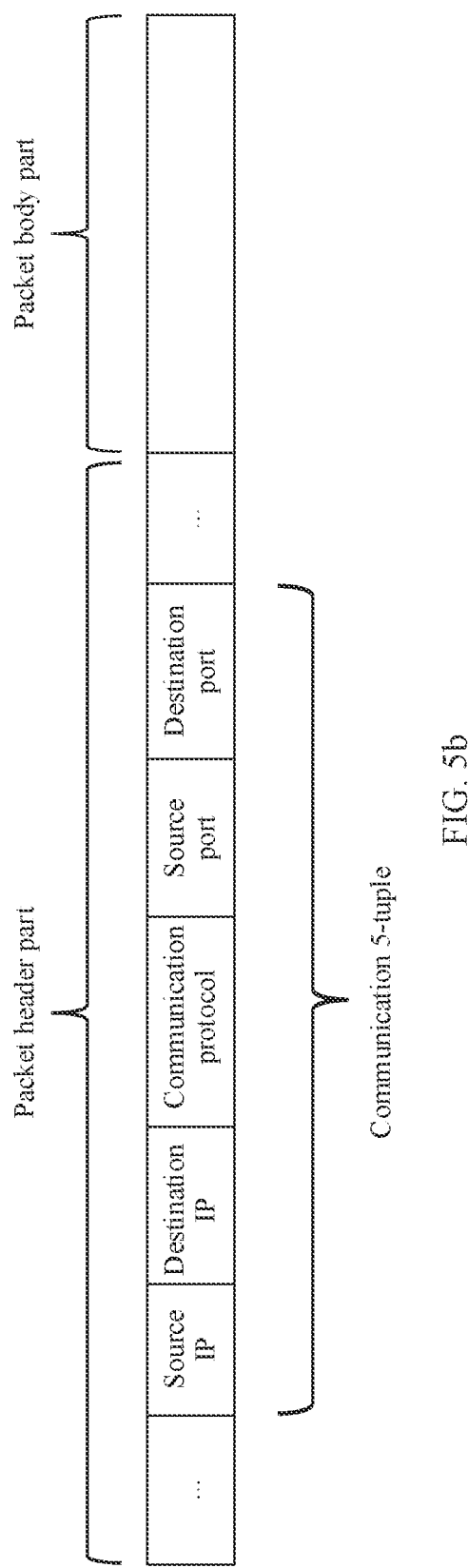
FIG. 5b is a schematic diagram of a structure of a network data packet according to an embodiment of this application.

Referring to FIG. 5b, a network data packet includes a packet header part and a packet body part. The packet header part includes communication control information. The communication control information is used to ensure that the network data packet is correctly transmitted in a communication channel. The packet body part includes message information carried in the network data packet.

In communication over the Internet, a communication workflow is a workflow in which two processes in two hosts (which are respectively a source host and a destination host) exchange data. A process that sends data is a source process, and a process that receives data is a destination process.

It can be understood that when sending data to the destination process, the source process needs to know a location of the destination host on the Internet and an identifier of the destination process in the destination host. In a TCP/IP protocol, the location of the destination host is an IP address of the destination host (namely, a destination IP address), and the identifier of the destination process in the destination host is a port number of the destination process (namely, a destination port).

In addition, to help the destination process send an echo message to the source process, the network data packet further carries address information of the source process. The address information of the source process includes a source IP address (an IP address of the source host) and a source port (a port number of the source process in the source host).

The foregoing source IP address, destination IP address, source port, and destination port and a communication protocol (such as TCP, UDP, or ICMP) are referred to as a communication 5-tuple in the network data packet. It can be understood that addresses of the source process and the destination process can be completely identified by using the communication 5-tuple, thereby ensuring correct transmission of the network data packet over network.

It should be noted that, in FIG. 5b, a location of the communication 5-tuple in the network data packet is merely an example illustration, and is intended for describing the technical solutions of this embodiment more clearly, but does not represent an actual location of the communication 5-tuple in the network data packet.

S240: The modem obtains a communication 5-tuple in the network data packet through parsing.

In this embodiment, the modem includes a TCP/IP protocol stack program, which obtains, by parsing the network data packet, the communication 5-tuple carried in the network data packet.

The modem may obtain all the five fields in the communication 5-tuple in the network data packet through parsing, or may obtain some fields in the communication 5-tuple through parsing. A 5-tuple field that the modem needs to obtain through parsing is specifically described in step S250 and step S260.

S250: The modem compares a 5-tuple field that is in the network data packet and that is obtained through parsing with a 5-tuple entry in a filtering list stored in the modem, to determine whether the network data packet matches the 5-tuple entry; and if the network data packet matches the 5-tuple entry, performs step S260; or if the network data packet does not match the 5-tuple entry, performs step S280.

In this embodiment, the 5-tuple entry is used to indicate that a data packet matching the 5-tuple entry is a broadcast data packet. To be specific, when the network data packet matches the 5-tuple entry, the network data packet can be determined as a broadcast data packet, and step S260 is performed to further determine whether the network data packet is a data packet required by the terminal device 100. When the network data packet does not match the 5-tuple entry, it is determined that the network data packet is not a broadcast data packet, and step S280 is performed to transmit the network data packet to the application processor AP.

For continuity of description, a specific manner for setting a 5-tuple entry in the filtering list is described at the end of this embodiment.

S260: The modem determines whether an application program for receiving the network data packet is started on the terminal device 100; and if the application program for receiving the network data packet is started, performs step S270; or if the application program for receiving the network data packet is not started, performs step S280.

When it is determined in step S250 that the network data packet is a broadcast data packet, whether the application program for receiving the network data packet is started on the terminal device 100 is further determined, to determine whether the network data packet is a data packet required by the terminal device 100. The application program for receiving the network data packet is, for example, a communication application program such as an instant messaging program (such as WeChat™), an email program (such as Foxmail™), or a browser program (such as Safari™).

To communicate with another host on a network, a number of a port for receiving/sending a network data packet is determined when the communication application program is started to run. A server program has a fixed port number, and a client process dynamically select a port number when the program is started to run.

The modem reads a port number in an effective state from the application processor AP, and stores the port number in an effective port number list. After receiving the network data packet, the modem queries whether a destination port number in the network data packet exists in the effective port number list. If the destination port number exists in the port number list, it is determined that the application for receiving the network data packet is started on the terminal device 100; otherwise, it is determined that the application for receiving the network data packet is not started on the terminal device 100.

In this embodiment, when communication application programs running on the terminal device 100 change, for example, a new communication application program is started or a communication application program is exited, port numbers in an effective state change. The application processor AP notifies the modem of port number update information, so that the modem updates the effective port number list.

In addition, in this embodiment, whether the destination port number in the network data packet exists in the effective port number list is queried, to determine whether the application for receiving the network data packet is started on the terminal device 100. Therefore, it can be understood that all or some fields that are of the communication 5-tuple in the network data packet and that are obtained through parsing in step S240 should include the destination port number in the network data packet.

S270: The modem discards the network data packet.

When the network data packet matches the 5-tuple entry and the application program for receiving the network data packet is not started on the terminal device 100, the network data packet is a data packet not required by the terminal device 100. In this case, the modem discards the data packet, for example, releases a cache for storing the data packet.

S280: The modem sends the network data packet to the application processor AP After receiving the network data packet, the application processor AP delivers, based on a protocol and the destination port number in the data packet, a message in the data packet to the application program (for example, WeChat) for receiving the data packet, so that the application program performs an operation corresponding to the network data packet (for example, displaying chat content carried in the message in a chat window).

In this embodiment, the modem stores the filtering list. When receiving the network data packet, the modem performs filtering on the network data packet based on the filtering list, to determine whether the received network data packet is a data packet not required by the terminal device 100. When the network data packet is a data packet not required by the terminal device 100, the modem discards the data packet.

This embodiment can avoid frequently waking up the application processor AP, thereby reducing power consumption of the terminal device 100. Especially when a large quantity of broadcast data packets exist in a network environment, this embodiment can significantly reduce power consumption of the terminal device 100.

In some variant embodiments of this embodiment, when it is determined in step S250 that the received network data packet is a broadcast data packet (specifically, the network data packet matches at least one 5-tuple entry), it is considered that the network data packet is a data packet not required by the terminal device 100, and step S270 is directly performed (to discard the network data packet), without performing step S260 (to determine whether the application for receiving the network data packet is started on the terminal device 100). In other words, in this embodiment, all broadcast data packets (for example, broadcast data packets whose destination ports are a specified port) that meet the determining condition in step S250 are discarded.

Figures 5C, 6, 7:
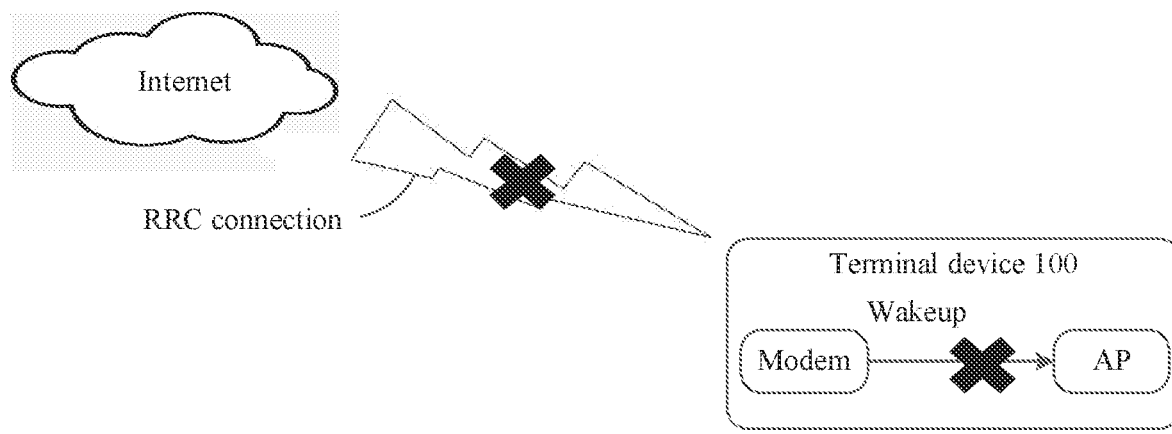
FIG. 5c is a schematic diagram of a network data packet filtering list according to an embodiment of this application.
FIG. 6 is a schematic diagram of an effect of an embodiment of this application.
FIG. 7 is a schematic diagram of a principle of a network data packet transmission method according to an embodiment of this application.

The following describes a specific manner for setting a 5-tuple entry in the filtering list in the modem with reference to FIG. 5c.

FIG. 5c shows a filtering list provided in this embodiment. The filtering list includes five 5-tuple entries. Each entry includes five comma-separated fields. The five fields respectively correspond to five fields in a communication 5-tuple. In this embodiment, from left to right, the fields in the 5-tuple entry respectively correspond to a source IP address, a source port, a destination IP address, a destination port, and a network protocol of the communication 5-tuple.

The 5-tuple entry is used to determine a broadcast data packet based on a preset rule. The preset rule may be set by defining a value of each field in the 5-tuple entry. In this embodiment, the value of each field in the 5-tuple entry is set based on a characteristic of a broadcast data packet. In this way, the 5-tuple entry can be used to indicate that a data packet matching the 5-tuple entry is a broadcast data packet. Therefore, when a network data packet matches the 5-tuple entry, the network data packet can be determined as a broadcast data packet.

The following describes manners for setting the entries in FIG. 5c.

(1) In an entry 1, a value of a destination IP field is 198.220.220.255, and values of other fields are 0. The fields whose values are 0 are wildcard fields. A meaning of a wildcard field is as follows: Regardless of a value of a field that is in a 5-tuple in a network data packet and that corresponds to the wildcard field, it is considered that the value of the corresponding field is the same as a value of the wildcard field. In this embodiment, the numeric value "0" is used to represent a wildcard field. In other embodiments, alternatively, another numeric value/character (for example, "match") may be used to represent a wildcard field.

When a value of each field in a 5-tuple in a network data packet is the same as a value of a corresponding field in a 5-tuple entry, it is determined that the communication 5-tuple in the network data packet matches the 5-tuple entry (or that the network data packet matches the 5-tuple entry). Otherwise, it is determined that the communication 5-tuple in the network data packet does not match the 5-tuple entry (or that the network data packet does not match the 5-tuple entry).

All fields other than the destination IP address in the entry 1 are wildcard fields. Therefore, when a destination IP address in a network data packet is 198.220.220.255, it is considered that the network data packet matches the entry 1, regardless of a source IP address, a communication protocol, and the like in the network data packet. When the destination IP address in the network data packet has a value other than 198.220.220.255, it is considered that the network data packet does not match the entry 1.

In the entry 1, the value of the destination IP address field is set to 198.220.220.255, so that the entry 1 is used to indicate that a data packet matching the entry is a broadcast data packet, thereby performing filtering on the data packet.

As described above, the network ID of the network (namely, the network A) on which the terminal device 100 is located is 198.220.220. Therefore, when a destination IP address in a network data packet is 198.220.220.255, it can be determined that the network data packet is a broadcast data packet sent to the network A. Therefore, in this embodiment, in the 5-tuple entry 1, the value of the destination IP address field is set to 198.220.220.255, to indicate that a data packet matching the entry 1 is a broadcast data packet.

(2) In an entry 2, a value of a destination port field is 137, and values of other fields are 0. To be specific, when a destination port in a network data packet is 137, it is considered that the network data packet matches the entry 2. When the destination port in the network data packet has a value other than 137, it is considered that the network data packet does not match the entry 2.

In the entry 2, the value of the destination port field is set to 137, so that the entry 2 is used to indicate that a data packet matching the entry is a network data packet.

Port with a number of 137 is a name server (NBNS) port of a network basic input/output system (NetBIOS). NetBIOS is used to provide a data sharing interface for computers on a local area network, for example, for implementing printer sharing on the local area network. A NetBIOS service is a common service on a computer. Therefore, in some operating systems, the port 137 is open by default.

When the port with a number of 137 on the terminal device 100 is in an open state, a host on the Internet can obtain information such as a host name and a user name of the terminal device 100 simply by sending a request to the port 137 of the terminal device 100. Therefore, some hosts (which may be malicious hosts) on a network may send broadcast messages to a destination network by using the port 137 as a destination port, to obtain information about a host on the network.

In this embodiment, when a destination port number in a network data packet is 137, the network data packet is determined as a broadcast data packet. Therefore, in this embodiment, in the 5-tuple entry 2, the value of the destination port field is set to 137, to indicate that a data packet matching the entry 2 is a broadcast data packet.

In the entry 2, the port with a number of 137 is used as an example to describe a manner for setting a destination port field. This application is not limited thereto. In another entry, a value of a destination port field may be set based on a common destination port through which a broadcast message is sent in a network environment. For example, the value of the destination port field is set to 123, 138, 139, or 593.

(3) In an entry 3, a value of a destination port field is 445, and a value of a communication protocol field is UDP. To be specific, when a destination port in a network data packet is 137 and a value of a communication protocol in the network data packet is UDP, it is considered that the network data packet matches the entry 3. Otherwise, it is considered that the network data packet does not match the entry 3.

Similar to that in the entry 2, in the entry 3, the value of the destination port field is set, so that the entry 3 is used to indicate that a data packet matching the entry is a broadcast data packet. Unlike in the entry 2, in the entry 3, the value of the communication protocol field is further specified.

This is because a port 445 is a port shared by a TCP protocol and a UDP protocol. Therefore, a destination process for receiving a network data packet can be uniquely determined only by specifying the values of both the destination port field and the communication protocol field. The UDP protocol is a connectionless protocol. Therefore, when a protocol in a network data packet is the UDP protocol, the data packet is more likely a data packet not required by the terminal device 100. Therefore, in the entry 3, the value of the communication protocol field is set to UDP. This application is not limited thereto. In another entry, when the value of the destination port field is 445, the value of the communication protocol field may alternatively not be specified (in other words, the communication protocol field is set as a "wildcard field").

(4) In an entry 4, a value of a destination IP field is 255.255.255.255, and values of other fields are 0. To be specific, in the entry 4, the value of the destination IP field is set to 255.255.255.255, so that the entry 4 is used to indicate that a data packet matching the entry is a broadcast data packet.

As described above, the IP address 255.255.255.255 is a limited broadcast IP address (namely, a broadcast IP address that can be used to send a broadcast data packet only to a host on a current network). Therefore, the entry 4 may be used to indicate that a data packet matching the entry is a broadcast data packet from the current network (namely, the network A).

(5) In an entry 5, a value of a source IP field is 198.220.220.10, and values of other fields are 0. To be specific, in the entry 5, the value of the source IP field is set to 198.220.220.10, so that the entry 5 is used to indicate that a data packet matching the entry is a broadcast data packet.

On the Internet, there may be some hosts that frequently send a broadcast message to a network. Therefore, in some 5-tuple lists in this embodiment, an IP address of the host is set as a value of a source IP field in a 5-tuple list, so that the 5-tuple list is used to indicate that a data packet matching the 5-tuple list is a broadcast data packet, thereby performing filtering on the data packet.

Specifically, for example, it is assumed that a host (whose IP address is 198.220.220.10) on the current network (namely, the network A) is a host that frequently sends a broadcast message to the network. Therefore, in a list 5, the value of the source IP address field is set to 198.220.220.10, so that the list 5 is used to indicate that a data packet matching the list is a broadcast data packet.

In this embodiment, the modem compares the 5-tuple fields in the network data packet with the 5-tuple entries one by one; and when the network data packet matches one of the 5-tuple lists, it is considered that the network data packet is a broadcast data packet and step S260 is performed; or if the network data packet matches none of the 5-tuple lists, it is considered that the network data packet is not a broadcast data packet and step S280 is performed.

In the example shown in FIG. 5c, each 5-tuple entry includes five fields that are in a one-to-one correspondence with 5-tuple fields. Therefore, to perform matching with the 5-tuple entries in FIG. 5c to determine whether the network data packet is a broadcast data packet, all the five fields in the communication 5-tuple in the network data packet need to be obtained through parsing in step S240.

However, this application is not limited thereto. For example, in another embodiment, a quantity of fields in a 5-tuple entry may be less than 5 (in other words, a quantity of fields in a 5-tuple entry is not limited in this application). For example, a 5-tuple list may include only two fields: a destination port number field and a communication protocol field. In this embodiment, only the destination port number and a communication protocol in the network protocol 5-tuple in the network data packet may be obtained through parsing in step S240.

In addition, a person skilled in the art may further derive other variants of the manners for setting 5-tuple entries in FIG. 5c. For example, a sorting sequence of the fields in the 5-tuple entries in FIG. 5c may be changed. For another example, a wildcard field may not be set in the 5-tuple entry, but a value is specified for each field instead.

FIG. 6 is an effect diagram of this embodiment, and shows a packet capturing result for data packets sent and received by the terminal device 100. The port 137 of an NBNS service is not enabled on the terminal device 100. When a host on the Internet sends, to the terminal device 100, a name query (Name query NB) packet corresponding to the port 137, the name query packet is discarded by the modem, without waking up the application processor AP of the terminal device 100. Therefore, the terminal device 100 generates a destination unreachable (Destination unreachable) packet by using an Internet control message protocol (Internet Control Message Protocol. ICMP).

Embodiment 2

Referring to FIG. 7, this embodiment provides a network data packet transmission method, reduce power consumption of a terminal device 100. In this embodiment, when the terminal device 100 receives a paging message from a network-side device, a modem determines, based on a current working mode of the terminal device 100, whether to respond to the paging message. When the current working mode of the terminal device 100 is a network data packet receiving restriction mode (for example, a do-not-disturb switch (such as a flight mode switch) of the terminal device 100 is turned on), the modem does not respond to the received paging message (for example, the modem does not establish an RRC connection to the network-side device or does not receive a data packet from a network), to reduce power consumption of the terminal device 100.

Figure 8:
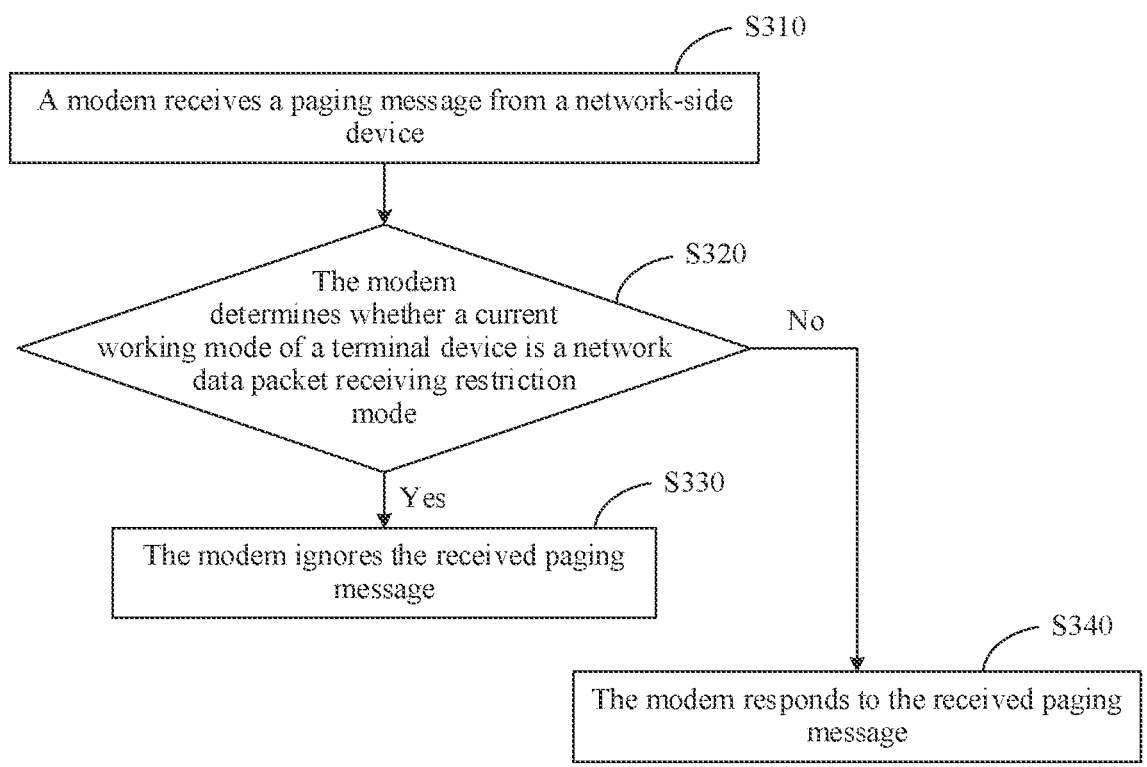
FIG. 8 is a schematic flowchart of a network data packet transmission method according to an embodiment of this application.

Specifically, referring to FIG. 8, this embodiment includes the following steps.

S310: The modem receives a paging message from a network-side device, where the paging message is used to inform the terminal device 100 that a data packet is delivered from a network.

S320: The modem determines whether a current working mode of the terminal device 100 is a network data packet receiving restriction mode; and if yes, performs step S330; otherwise, performs step S340.

Specifically, an application processor AP determines the current working mode of the terminal device 100 based on a working scenario of the terminal device 100. Then the modem obtains a determining result from the application processor AP; and determines, based on the obtained determining result, whether the current working mode of the terminal device 100 is a network data packet response restriction mode. In this specification, that "the modem obtains a determining result from the application processor AP" may be as follows: The application processor AP actively informs the modem of the determining result, or the modem reads the result determining from the application processor AP.

When at least one of the following conditions A to E is met, the application processor AP determines that the current working mode of the terminal device 100 is the network data packet receiving restriction mode.

Condition A: System time of the terminal device 100 falls within a specified time segment. A value of the specified time segment may be determined based on a requirement of a user. For example, a time segment (for example, 23:00 to 6:00 next day) during which the user sleeps at night is determined as the specified time segment.

Condition B: A display of the terminal device 100 is off. When the display of the terminal device 100 is off, a user usually does not perform an interactive operation with the terminal device 100. A network application on the terminal device 100 may receive a data packet from a network with a delay. Therefore, when the display of the terminal device 100 is off, the application processor AP may determine that the current working mode of the terminal device 100 is the network data packet receiving restriction mode.

Condition C: An amount of invalid data packets received by the terminal device 100 in a specified period of time (for example, 1 minute) exceeds a specified threshold. An invalid data packet is a data packet not required by the terminal device 100. For example, an application process for receiving the data packet is not running on the terminal device 100. In this embodiment of this application, the amount of invalid data packets may be a quantity of invalid data packets, or may be a volume of data (for example, a quantity of elements) included in the invalid data packets.

Condition D: A do-not-disturb switch of the terminal device 100 is turned on. For example, a do-not-disturb switch operable to a user may be added to a display interface of the terminal device 100. When detecting that the user turns on the switch, the application processor AP determines that the current working mode of the terminal device 100 is the network data packet receiving restriction mode. The user may turn on the do-not-disturb switch when the user does not want to be disturbed by a network application during a meeting, a visit, working, sleeping, and the like.

Condition E: An IP multimedia system (IP Multimedia Subsystem, IMS) of the terminal device 100 is not registered, or a voice over LTE (voice over LTE, VoLTE) function of the terminal device 100 is disabled. When the IMS of the terminal device 100 is not registered, or the voice over LTE function of the terminal device 100 is disabled, it indicates that the terminal device 100 supports but does not enable the VoLTE function (this may be because a user temporarily disables the VoLTE voice call function). In this case, restriction on receiving of a network data packet does not substantially affect the VoLTE voice call function, and it can be determined that the current working mode of the terminal device 100 is the network data packet receiving restriction mode. It should be noted that a circuit switching (Circuit Switching, CS)-based communication mode is not limited in this embodiment. In the network data packet receiving restriction mode, the terminal device 100 may receive a call based on CS.

S330: The modem ignores the received paging message, does not initiate an RRC connection to the network-side device, and does not receive the data packet from the network, thereby reducing power consumption of the terminal device 100.

S340: The modem responds to the received paging message. For example, the modem initiates an RRC connection to the network-side device, and normally receives data or the like from the network. For a specific workflow, refer to a workflow in a conventional technology (for example, the descriptions in steps S120 to S150). Details are not described herein again.

In this embodiment, when receiving the paging message from the network-side device, the terminal device 100 first determines the current working mode of the terminal device 100. When the current working mode of the terminal device 100 is the network data packet receiving restriction mode, the modem does not respond to the paging message (for example, the modem does not initiate an RRC connection and does not receive the data packet), thereby reducing power consumption of the terminal device 100.

Embodiment 3

This embodiment provides a network data packet filtering method. The network data packet filtering method provided in this embodiment is based on Embodiment 1 and Embodiment 2.

In Embodiment 2, when the terminal device 100 is in the network data packet receiving restriction mode, the terminal device 100 ignores the received paging message, and therefore the terminal device 100 does not receive a data packet from a network, including an IMS voice data packet. In other words, in Embodiment 2, when the terminal device 100 is in the network data packet receiving restriction mode, the terminal device 100 may miss an IMS voice call.

Therefore, in this embodiment, when a current working mode of a terminal device 100 is in a network data packet receiving restriction mode, instead of ignoring a received paging message, a modem responds to the paging message to receive a network data packet delivered by a network-side device 200. After receiving the network data packet, the modem performs filtering on the network data packet (specifically, the modem performs filtering on the network data packet based on the method provided in Embodiment 1).

Therefore, in this embodiment, even in the network data packet receiving restriction mode, provided that an IMS function of the terminal device 100 is registered, a user can normally receive an IMS voice call, thereby avoiding missing of the IMS voice call. In addition, in this embodiment, filtering is performed on the received network data packet, to avoid frequently waking up an application processor AP, thereby reducing power consumption of the terminal device 100.

Figure 9:
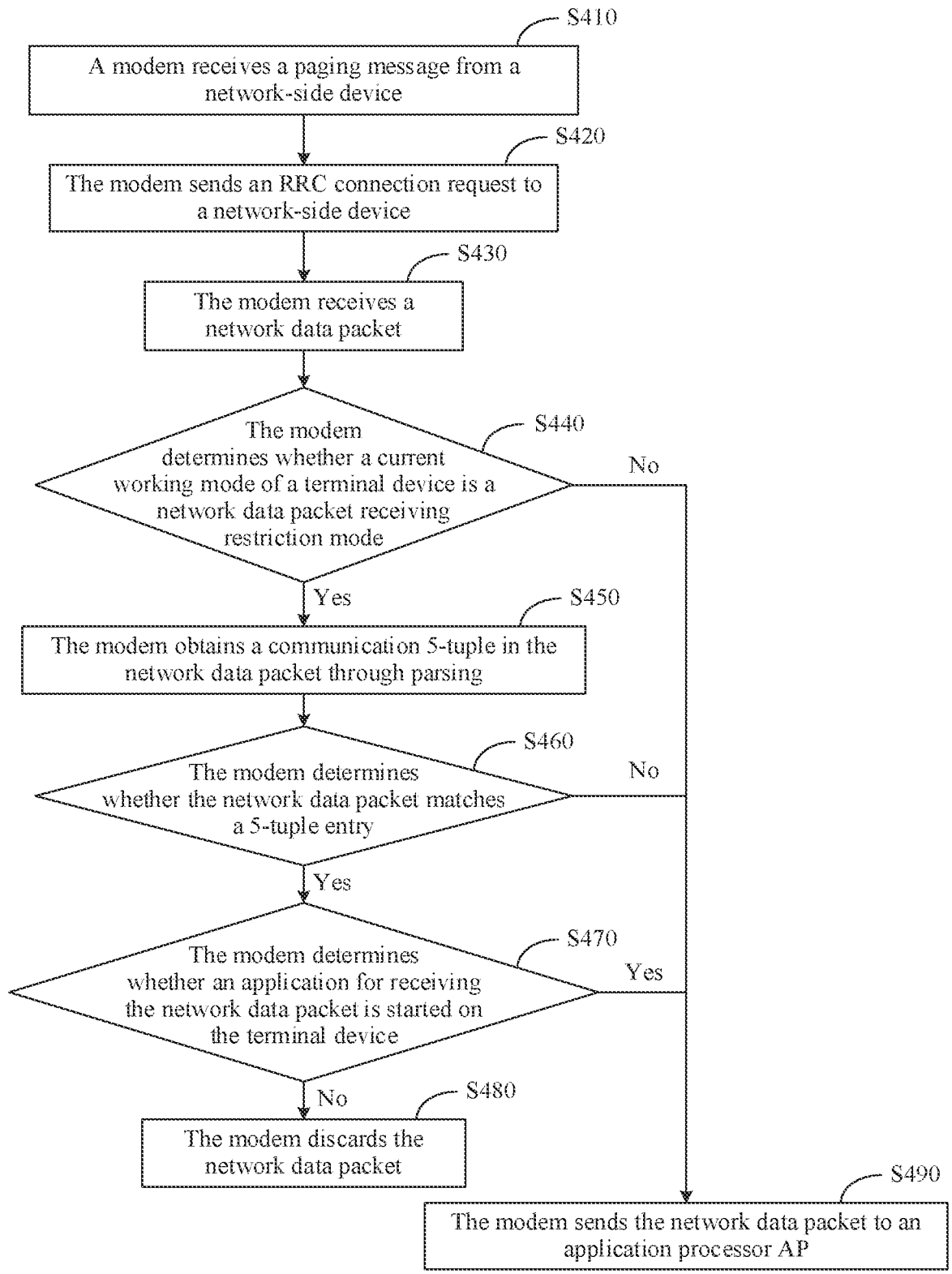
FIG. 9 is a second schematic flowchart of a network data packet filtering method according to an embodiment of this application.

Specifically, referring to FIG. 9, this embodiment includes the following steps.

S410: The modem receives a paging message from the network-side device 200, where the paging message is used to trigger the modem to initiate an RRC connection request to the network-side device 200.

S420: The modem sends the RRC connection request to the network-side device 200, to establish an RRC connection to the network-side device 200.

S430: The modem receives a network data packet.

Steps S410 to S430 are essentially the same as steps S210 to S230 in Embodiment 1. For specific details of steps S410 to S430, refer to the descriptions in Embodiment 1. Details are not described herein again.

S440: The modem determines whether the current working mode of the terminal device 100 is the network data packet receiving restriction mode; and if yes, performs step S450 to start a program for performing filtering on the network data packet; otherwise, performs step S490 to deliver the network data packet to the application processor AP.

Specifically, the application processor AP determines the current working mode of the terminal device 100 based on a working scenario of the terminal device 100. Then the modem obtains a determining result from the application processor AP; and determines, based on the obtained determining result, whether the current working mode of the terminal device 100 is a network data packet response restriction mode.

For a method used the application processor AP to determine a working mode of the terminal device 100, refer to the descriptions in step S320 in Embodiment 2 (for example, when at least one of the conditions A to E in step S320 is met, the application processor AP determines that the current working mode of the terminal device 100 is the network data packet receiving restriction mode). Details are not described herein again.

S450: The modem obtains a communication 5-tuple in the network data packet through parsing. Specifically, the modem obtains some or all of 5-tuple fields in the network data packet through parsing.

S460: The modem compares a 5-tuple field that is in the network data packet and that is obtained through parsing with a 5-tuple entry in a filtering list stored in the modem, to determine whether the network data packet matches the 5-tuple entry; and if the network data packet matches the 5-tuple entry, performs step S470 to further determine whether the network data packet is a data packet required by the terminal device 100; or if the network data packet does not match the 5-tuple entry, performs step S490 to transmit the network data packet to the application processor AP.

S470: The modem determines whether an application program for receiving the network data packet is started on the terminal device 100; and if the application program for receiving the network data packet is not started, performs step S480; or if the application program for receiving the network data packet is started, performs step S490.

The modem reads a port number in an effective state from the application processor AP, and stores the port number in an effective port number list. After receiving the network data packet, the modem queries whether a destination port number in the network data packet exists in the effective port number list. If the destination port number exists in the port number list, it is determined that the application for receiving the network data packet is started on the terminal device 100; otherwise, it is determined that the application for receiving the network data packet is not started on the terminal device 100.

S480: The modem discards the network data packet, for example, releases a cache for storing the data packet.

S490: The modem sends the network data packet to the application processor AP After receiving the network data packet, the application processor AP delivers a message in the data packet to the application program (for example, WeChat) for receiving the data packet.

Steps S450 to S490 are essentially the same as steps S240 to S280 in Embodiment 1. For specific details of steps S450 to S490, refer to the descriptions in Embodiment 1. Details are not described herein again.

In this embodiment, when the terminal device 100 is in the network data packet receiving restriction mode, the modem performs filtering on the network data packet, to avoid frequently waking up the application processor AP, thereby reducing power consumption of the terminal device 100. Especially when a large quantity of broadcast data packets exist in a network environment, this embodiment can significantly reduce power consumption of the terminal device 100.

In addition, the modem normally receives a data packet required by the terminal device 100 (a corresponding application is enabled on the terminal device 100), and transmits the data packet to the application processor AP, thereby avoiding missing of an IMS call.

In addition, sequence numbers of the steps in the embodiments are not intended to limit an implementation sequence of the steps. On a premise that the purposes of invention are fulfilled, orders of the steps may be adjusted. For example, orders of step S250 and step S260 may be changed, and orders of steps S430 and S440 may be changed.

Figure 10:
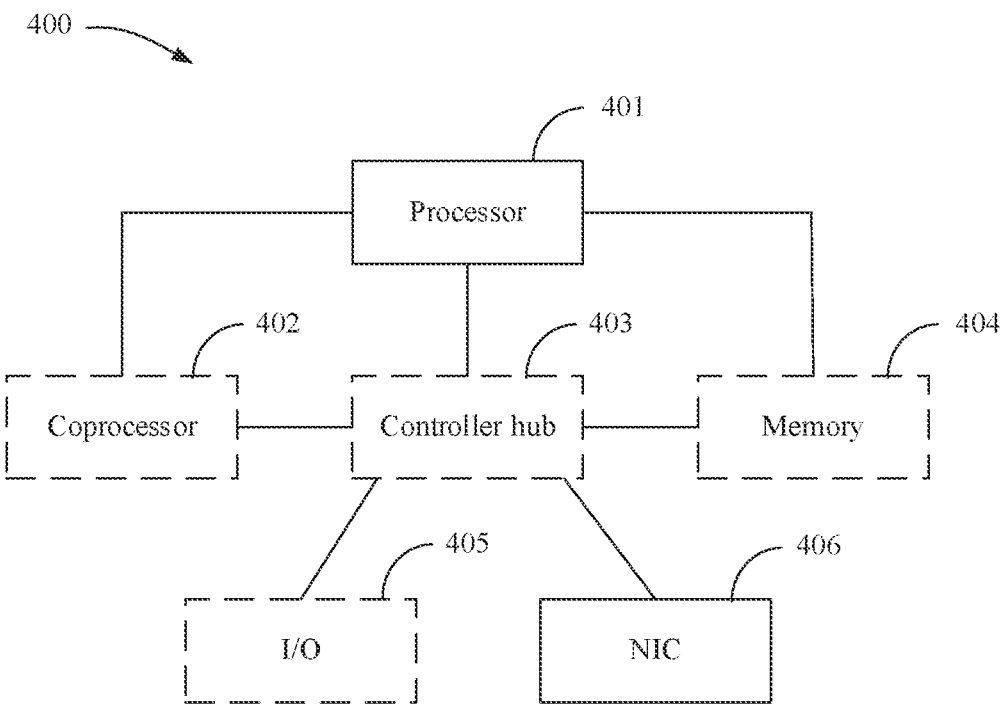
FIG. 10 is a block diagram of a terminal device according to an embodiment of this application.

Now, referring to FIG. 10. FIG. 10 is a block diagram of a terminal device 400 according to an embodiment of this application. The terminal device 400 may include one or more processors 401 coupled to a controller hub 403. In at least one embodiment, the controller hub 403 communicates with the processor 401 by using a multi-branch bus such as a front side bus (FSB, Front Side Bus), a point-to-point interface such as QuickPath Interconnect (QPI, QuickPath Interconnect), or a similar connection 406. The processor 401 executes instructions that control a data processing operation of a general type. In an embodiment, the controller hub 403 includes but is not limited to: a graphics & memory controller hub (GMCH, Graphics & Memory Controller Hub) (not illustrated) and an input/output hub (IOH, Input Output Hub) (which may be located on a separate chip) (not illustrated). The GMCH includes a memory controller and a graphics controller, and is coupled to the IOH.

The terminal device 400 may further include a coprocessor 402 and a memory 404 that are coupled to the controller hub 403. Alternatively, either or both of the memory and the GMCH may be integrated into a processor (as described in this application). The memory 404 and the coprocessor 402 are directly coupled to the processor 401 and the controller hub 403. The controller hub 403 and the IOH are located on a single chip.

The memory 404 may be, for example, a dynamic random access memory (DRAM, Dynamic Random Access Memory), a phase change memory (PCM, Phase Change Memory), or a combination thereof. The memory 404 may include one or more non-transitory tangible computer-readable media that are configured to store data and/or instructions. The computer-readable storage medium stores instructions, and specifically, stores temporary and permanent copies of the instructions. The instructions may include instructions that when executed by at least one of the processors, the terminal device 400 is enabled to implement the method shown in FIG. 5a, FIG. 8, or FIG. 9. When the instructions are run on a computer, the computer is enabled to perform the methods/method disclosed in Embodiment 1, Embodiment 2, and/or Embodiment 3.

In an embodiment, the coprocessor 402 is a dedicated processor, for example, a high-throughput MIC (Many Integrated Core, many integrated core) processor, a network or communication processor, a compression engine, a graphics processor, a GPGPU (General-purpose computing on graphics processing units, general-purpose computing on graphics processing units) processor, or an embedded processor. A property of being optional of the coprocessor 402 is indicated by dashed lines in FIG. 10.

In an embodiment, the terminal device 400 may further include a network interface (NIC, Network Interface Controller) 406. The network interface 406 may include a transceiver, configured to provide a radio interface for the terminal device 400 to communicate with any other appropriate device (for example, a front-end module and an antenna). In various embodiments, the network interface 406 may be integrated with another component of the terminal device 400. The network interface 406 may implement a function of a communication unit in the foregoing embodiments.

The terminal device 400 may further include an input/output (I/O, Input/Output) device 405. The I/O 405 may include: a user interface, where the design enables a user to interact with the terminal device 400; a peripheral component interface design that also enables a peripheral component to interact with the terminal device 400; and/or a sensor design used to determine an environmental condition and/or location information related to the terminal device 400.

It should be noted that FIG. 10 is merely an example. To be specific, although as shown in FIG. 10, the terminal device 400 includes a plurality of components such as the processor 401, the controller hub 403, and the memory 404, in actual application, a device that uses the methods in this application may include only some of the components of the terminal device 400, for example, may include only the processor 401 and the network interface 406. A property of being optional of a component in FIG. 10 is indicated by dashed lines.

Figure 11:
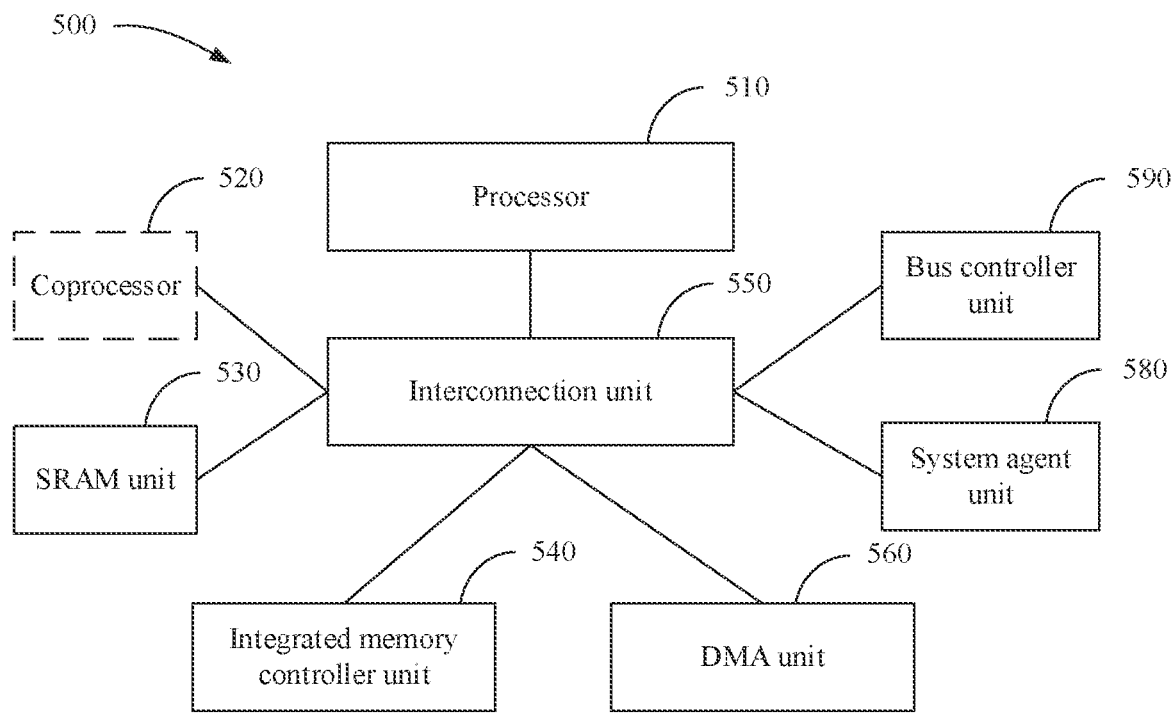
FIG. 11 is a schematic diagram of a structure of a system on chip (SoC, System on Chip) according to an embodiment of this application.

Now, referring to FIG. 11. FIG. 11 is a block diagram of a SoC (System on Chip, system on chip) 500 according to an embodiment of this application. In FIG. 11, similar parts have the same reference numeral. In addition, a dashed-line box indicates a more advanced optional feature of the SoC. In FIG. 11, the SoC 500 includes an interconnection unit 550, which is coupled to a processor 510; a system agent unit 580; a bus controller unit 590; an integrated memory controller unit 540; a group of or one or more coprocessors 520, which may include integrated graphics logic, a graphics processor, an audio processor, and a video processor; a static random access memory (SRAM, Static Random Access Memory) unit 530; and a direct memory access (DMA, Direct Memory Access) unit 560. In an embodiment, the coprocessor 520 includes a dedicated processor, for example, a network or communication processor, a compression engine, a GPGPU (General-purpose computing on graphics processing units, general-purpose computing on graphics processing units) processor, a high-throughput MIC processor, or an embedded processor.

The static random access memory (SRAM) unit 530 may include one or more non-transitory tangible computer-readable media that are configured to store data and/or instructions. The computer-readable storage medium stores instructions, and specifically, stores temporary and permanent copies of the instructions. The instructions may include instructions that when executed by at least one of the processors, the SoC is enabled to implement the method shown in FIG. 5a, FIG. 8, or FIG. 9. When the instructions are run on a computer, the computer is enabled to perform the methods/method disclosed in Embodiment 1, Embodiment 2, and/or Embodiment 3.

The term "and/or" in this specification describes only an association relationship for describing associated objects and represents that three relationships may exist. For example, A and/or B may represent the following three cases: Only A exists, both A and B exist, and only B exists.

The implementations of the methods in this application all may be implemented in a form of software, a magnetic member, firmware, or the like.

Program code may be applied to an input instruction to perform various functions described in this specification and generate output information. The output information may be applied to one or more output devices in a known manner. To achieve purposes of this application, a processing system includes any system that has a processor such as a digital signal processor (DSP, Digital Signal Processor), a microcontroller, an application-specific integrated circuit (ASIC), or a microprocessor.

The program code may be implemented by using an advanced procedural language or an object-oriented programming language, to communicate with the processing system. The program code may alternatively be implemented by using an assembly language or a machine language when necessary. Actually, the mechanisms described in this specification are not limited to a scope of any specific programming language. In any case, the language may be a compiling language or an interpretive language.

One or more aspects of at least one embodiment may be implemented by using representative instructions stored in a computer-readable storage medium. The instructions represent various types of logic in a processor. When the instructions are read by a machine, the machine is enabled to produce logic for executing the technologies described in this specification. Expressions referred to as "IP (Intellectual Property, intellectual property) cores" may be stored in a tangible computer-readable storage medium and provided for a plurality of clients or production facilities to be loaded to a manufacturing machine that actually manufactures the logic or processor.

In some cases, an instruction converter may be used to convert an instruction from a source instruction set to a destination instruction set. For example, the instruction converter may convert, through conversion (for example, through static binary conversion or dynamic binary conversion that includes dynamic compilation), transformation, simulation, or another manner, an instruction into one or more other instructions to be processed by a core. The instruction converter may be implemented by using software, hardware, firmware, or a combination thereof. The instruction converter may be located on a processor, outside the processor, or partially on the processor and partially outside the processor.

What is claimed is:

1. A method implemented by a terminal device, wherein the method comprises:
   storing one or more communication 5-tuple entries, wherein the communication 5-tuple entries determines broadcast data packets based on a preset rule, wherein the preset rule is set by defining a first value of a field comprised in each of the one or more communication 5-tuple entries;
   receiving a network data packet comprising a communication 5-tuple;
   parsing the communication 5-tuple from the network data packet;
   determining whether the communication 5-tuple matches at least one of the one or more communication 5-tuple entries;
   determining, in response to determining that the communication 5-tuple matches the at least one of the one or more communication 5-tuple entries, that the network data packet is a first broadcast data packet to be discarded; and
   discarding, in response to determining that the network data packet is the first broadcast packet to be discarded, the first broadcast data packet.

2. The method of claim 1, further comprising further discarding the first broadcast data packet when determining that an application program corresponding to the network data packet is not running on the terminal device.

3. The method of claim 2, further comprising:
   obtaining port information currently listened to by an application processor of the terminal device; and
   further determining, based on the port information, that the application program corresponding to the network data packet is not running on the terminal device.

4. The method of claim 1, further comprising performing the method by a modem of the terminal device.

5. The method of claim 4, further comprising further storing the one or more communication 5-tuple entries in the modem.

6. The method of claim 1, further comprising setting the first value based on a characteristic of the broadcast data packets.

7. The method of claim 6, further comprising defining a second value of a destination Internet Protocol (IP) address field of at least one of the one or more communication 5-tuple entries as a broadcast IP address.

8. The method of claim 6, wherein one or more fields in each of the one or more communication 5-tuple entries are wildcard fields.

9. The method of claim 1, further comprising defining a second value of a destination port field of at least one of the one or more communication 5-tuple entries as 123, 137, 138, 139, 445, or 593.

10. The method of claim 1, further comprising:
obtaining a current working mode of the terminal device, wherein a working mode of the terminal device comprises a network data packet receiving restriction mode and a first mode different from the network data packet receiving restriction mode; and
discarding the first broadcast data packet when determining that the current working mode is the network data packet receiving restriction mode, determining that the network data packet is a second broadcast data packet, and determining that an application program corresponding to the network data packet is not running on the terminal device.

11. The method of claim 10, further comprising further obtaining, by a modem of the terminal device from an application processor of the terminal device, the current working mode.

12. The method of claim 11, further comprising further determining, by the application processor, that the current working mode is the network data packet receiving restriction mode when one or more first conditions are met, wherein the one or more first conditions comprise:
a system time of the terminal device is within a time segment;
a display of the terminal device is off;
an Internet Protocol (IP) multimedia system of the terminal device is not registered or a voice over Long-Term Evolution (LTE) function of the terminal device is disabled;
an amount of invalid data packets received by the terminal device in a period of time exceeds a threshold, wherein an invalid data packet comprises a destination port that is not listened to by the application processor; and
a do-not-disturb switch of the terminal device is turned on.

13. A terminal device comprising:
a memory configured to store one or more communication 5-tuple entries, wherein the communication 5-tuple entries determines broadcast data packets based on a preset rule, and wherein the preset rule is set by defining a first value of a field comprised in each of the one or more communication 5-tuple entries; and
a processor coupled to the memory and configured to:
receive a network data packet comprising a communication 5-tuple;
parse the communication 5-tuple from the network data packet;
determine whether the communication 5-tuple matches at least one of the one or more communication 5-tuple entries;
determine, in response to determining that the communication 5-tuple matches the at least one of the one or more communication 5-tuple entries, that the network data packet is a first broadcast data packet to be discarded; and
discard, in response to determining that the network data packet is the first broadcast packet to be discarded, the first broadcast data packet.

14. The terminal device of claim 13, wherein the processor is further configured to further discard the first broadcast data packet when determining that an application program corresponding to the network data packet is not running on the terminal device.

15. The terminal device of claim 14, wherein the processor is further configured to:
obtain port information currently listened to by an application processor of the terminal device; and
further determine, based on the port information, that the application program is not running on the terminal device.

16. The terminal device of claim 13, wherein the processor is further configured to set the first value based on a characteristic of the broadcast data packets.

17. The terminal device of claim 16, wherein the processor is further configured to define a second value of a destination Internet Protocol (IP) address field of at least one of the one or more communication 5-tuple entries as a broadcast IP address.

18. The terminal device of claim 16, wherein one or more fields in each of the one or more communication 5-tuple entries are wildcard fields.

19. The terminal device of claim 13, wherein the processor is further configured to define a second value of a destination port field of at least one of the one or more communication 5-tuple entries as 123, 137, 138, 139, 445, or 593.

20. The terminal device of claim 13, wherein the processor is further configured to:
obtain a current working mode of the terminal device, wherein a working mode of the terminal device comprises a network data packet receiving restriction mode and a first mode different from the network data packet receiving restriction mode; and
discard the first broadcast data packet when determining that the current working mode is the network data packet receiving restriction mode, determining that the network data packet is a second broadcast data packet, and determining that an application program corresponding to the network data packet is not running on the terminal device.

* * * * *